United States Patent
Garrigus (10) Patent No.: US 9,033,630 B2
(45) Date of Patent: May 19, 2015

(54) CARGO SUPPORT SYSTEM

(71) Applicant: Ancra International LLC, Azusa, CA (US)

(72) Inventor: Richard T. Garrigus, Mooresville, IN (US)

(73) Assignee: Ancra International LLC, Azusa, CA (US)

(*) Notice: Subject to any disclaimer, the term of this patent is extended or adjusted under 35 U.S.C. 154(b) by 0 days.

(21) Appl. No.: 14/461,649

(22) Filed: Aug. 18, 2014

(65) Prior Publication Data

US 2014/0356092 A1     Dec. 4, 2014

Related U.S. Application Data (63) Continuation of application No. 13/771,264, filed on Feb. 20, 2013, now abandoned.

(60) Provisional application No. 61/602,160, filed on Feb. 23, 2012.

(51) Int. Cl.
     *B60P 7/15*           (2006.01)

(52) U.S. Cl.
     CPC ....................... *B60P 7/15* (2013.01)

(58) Field of Classification Search
     CPC ............ B60P 7/06; B60P 7/08; B60P 7/0807; B60P 7/0815; B60P 7/135; B60P 7/15; B61D 45/00; B61D 45/001
     USPC .................. 410/143, 144, 152, 115
     See application file for complete search history.

(56) References Cited

U.S. PATENT DOCUMENTS

| | | | | |
|---|---|---|---|---|
| 3,842,756 | A * | 10/1974 | Marulic | 410/102 |
| 5,195,800 | A * | 3/1993 | Stafford et al. | 296/186.1 |
| 5,700,118 | A * | 12/1997 | Bennett et al. | 410/113 |
| 6,074,143 | A * | 6/2000 | Langston et al. | 410/89 |
| 6,578,902 | B2 * | 6/2003 | Sill | 296/186.1 |
| 6,626,622 | B2 * | 9/2003 | Zubko | 410/113 |
| 6,742,974 | B2 * | 6/2004 | Haire | 410/115 |
| 6,824,341 | B2 * | 11/2004 | Ehrlich | 410/150 |
| 7,066,529 | B2 * | 6/2006 | Yurgevich et al. | 296/186.1 |
| 7,134,820 | B2 * | 11/2006 | Ehrlich | 410/150 |
| 7,588,286 | B2 * | 9/2009 | Lewallen et al. | 296/186.1 |
| 7,762,618 | B2 * | 7/2010 | Lewallen et al. | 296/186.1 |
| 7,798,753 | B2 * | 9/2010 | Yurgevich | 410/115 |
| 7,931,328 | B2 * | 4/2011 | Lewallen et al. | 296/186.1 |
| 8,016,527 | B2 * | 9/2011 | Pattison et al. | 410/115 |
| 8,056,960 | B2 * | 11/2011 | Brown | 296/186.1 |
| 8,419,110 | B2 * | 4/2013 | Katz et al. | 296/186.1 |
| 8,506,221 | B2 * | 8/2013 | Pattison et al. | 410/115 |
| 2002/0098053 | A1 * | 7/2002 | Zubko | 410/115 |
| 2003/0184120 | A1 * | 10/2003 | Buchholz et al. | 296/181 |
| 2005/0074309 | A1 * | 4/2005 | Ehrlich | 410/115 |
| 2008/0197671 | A1 * | 8/2008 | Yurgevich | 296/186.1 |
| 2008/0219796 | A1 * | 9/2008 | Yurgevich | 410/115 |
| 2013/0136556 | A1 * | 5/2013 | Bose | 410/32 |

* cited by examiner

*Primary Examiner* — Hilary Gutman
(74) *Attorney, Agent, or Firm* — Brinks Gilson & Lione

(57) ABSTRACT

The combination of: a) a storage unit associated with an over-the-road vehicle, the storage unit having an internal wall surface bounding a storage space and including spaced and facing first and second wall surfaces and a floor surface; and b) a cargo support system. The cargo support system has first and second vertically extending tracks operatively mounted on each to the first and second wall surface and at least a first elongate beam having spaced first and second ends attached respectively to the first and second tracks in an operative position spaced above the floor surface. At least one of the tracks is maintained operatively mounted to the first wall surface through the use of an adhesive.

17 Claims, 6 Drawing Sheets

CARGO SUPPORT SYSTEM

This application is a continuation of U.S. nonprovisional application Ser. No. 13/771,264, filed on Feb. 20, 2013, which claimed priority from U.S. provisional application No. 61/602,160, filed on Feb. 23, 2012, the entirety of which are each fully incorporated by reference herein.

BACKGROUND OF THE INVENTION

1. Field of the Invention

This invention relates to cargo support systems and, more particularly, to a system for maintaining cargo in an elevated position relative to a floor surface in a storage space in over-the-road vehicles.

2. Background Art

The freight hauling industry has become increasingly competitive. Higher fuel costs have reduced margins. To remain competitive, entities are required to maximize utilization of cargo storage space in over-the-road vehicles, such as semi-trailers.

The assignee herein has developed cargo storage systems for such vehicles which allow more complete utilization of the upper volume of storage spaces which commonly is not occupied by cargo that is stacked from the floor upwards. The assignee herein offers, among other options, a system which it identifies as its Lift-A-Deck™ system. The Lift-A-Deck™ system utilizes vertically extending logistic tracks that are secured to facing side walls on such trailers. The tracks have a low profile so as not to occupy any significant volume of the usable storage space. Beams span between the tracks and may directly support cargo or panels upon which cargo can be placed. The tracks permit releasable connection of the beams at different heights that are selected based upon the configuration of the cargo.

With most trailers, these tracks can be integrated into the side walls of the trailer by using a series of fasteners that secure the tracks to framework in the side walls at spaced intervals from the floor to the roof of the vehicle. These fasteners will typically be directed through panels bounding the storage space and into reinforcing posts and other framework within the panels or to which the panels are secured.

While the same need for these elevated cargo supports exists in trailers that have a heated or cooled internal environment, modification of these conventionally constructed trailers to provide elevated supplemental cargo support surfaces presents problems, particularly with respect to mounting the tracks that support the spanning beams. These trailers are commonly constructed with insulated panels that have an insulating material between encasing layers or skins. These panels may extend substantially the full height of the storage space. These panels may lack a rigid structural framework that will support fasteners to positively secure the beam supporting tracks in a securely fixed position.

Incorporating framework into these panels during initial manufacture detrimentally changes their insulating properties such as R value, thereby decreasing efficiency of operation.

Insulating properties might also be compromised by directing fasteners into the panels without adequate internal structural framework. This may additionally compromise the overall integrity of these panels, which could lead to shifting or, in a worst case, release of the supplemental supporting structure. Penetration of these panels by fasteners may also make them prone to the detrimental ingress of environmental moisture, which may be absorbed by the insulating material.

Since the majority of the area of the insulated panels is not equipped to support penetrating fasteners, the only practical method of supporting beams in existing trailer units to this point has been to provide an independent framework that is primarily self-supporting. The vertical beam support components would thus be required to project into the storage volume, taking up valuable space that could otherwise be used to accommodate cargo.

While a need for supplemental, elevated cargo support in refrigerated trailers has existed, the industry has not devised a practical design that is commercially feasible in terms of being structurally sound while at the same time not taking up any appreciable amount of usable cargo space. The ability to retrofit existing cargo units with conditioned internal environments has particular value but, to date, has not been practically achievable.

SUMMARY OF THE INVENTION

In one form, the invention is directed to the combination of: a) a storage unit associated with an over-the-road vehicle, the storage unit having an internal wall surface bounding a storage space and including spaced and facing first and second wall surfaces and a floor surface; and b) a cargo support system. The cargo support system has first and second vertically extending tracks operatively mounted one each to the first and second wall surfaces and at least a first elongate beam having spaced first and second ends attached respectively to the first and second tracks in an operative position spaced above the floor surface. At least one of the tracks is maintained operatively mounted to the first wall surface through the use of an adhesive.

In one form, the one track has a vertical extent and is adhesively bonded to the first wall surface over the majority of the vertical extent of the one track.

In one form, the storage unit has a framework and a plurality of panels on the framework defines the internal wall surface. The one track is secured by at least one fastener extending into the framework at at least one of a top and bottom location on the one track.

In one form, the framework has top and bottom rails and at least one of the fasteners extends into the one track and each of the top and bottom rails.

In one form, the one track is adhesively bonded over substantially the entire vertical extent of the one track.

In one form, the cargo support system unit has a first plate that resides between the first wall and the one track.

In one form, the first plate is adhesively bonded to the first wall surface and the one track is adhesively bonded to the first plate.

In one form, the internal wall surface further has a ceiling surface and the one track and first plate are coextensive over substantially the entire distance between the floor and ceiling surfaces.

In one form, the first plate is adhesively bonded to the first wall surface and the one track is adhesively bonded to the first plate over substantially the entire distance between the floor and ceiling surfaces.

In one form, the framework has top and bottom rails and fasteners extend into the first plate, first wall surface and framework at each of the top and bottom rails.

In one form, there are no fasteners extending into the one track and first wall surface over a majority of the distance between the top and bottom rails.

In one form, the storage unit has a first plate that resides between the first wall surface and the one track over substantially a full vertical extent of the one track and there are no fasteners extending into the first plate and first wall surface over a majority of the distance between the top and bottom plates.

In one form, the first wall surface is defined by a first panel having an inner and an outer layer with insulation therebetween.

In one form, the first panel has a vertically extending reinforcing component and the first track is operatively mounted in overlying relationship with the reinforcing component.

In one form, the at least one fastener is a rivet.

In one form, the fasteners are rivets extending through the one track and first plate and into each of the top and bottom rails.

In one form, the storage unit has a refrigeration source for cooling the storage space.

In one form, the storage unit is a trailer on a semi-trailer unit.

In one form, the storage unit is fixedly attached to a towing unit.

In one form, the invention is directed to the combination of: a) a storage unit associated with an over-the-road vehicle, the storage unit having an internal wall surface bounding a storage space; and b) a cargo support system including a first track operatively mounted to the internal wall surface at a first location and configured to connect to a part of a cargo support component to operatively support the cargo support component. The storage unit is defined by inner and outer layers at the first location between which insulation is located. The internal wall surface is defined by the inner layer at the first location. The first track is maintained operatively mounted to the internal wall surface through the use of an adhesive.

In one form, the cargo support system includes a first plate that resides between the first track and the internal wall surface at the first location.

In one form, the first plate is adhesively bonded to the internal wall surface and the first track is adhesively bonded to the first plate.

DETAILED DESCRIPTION OF THE PREFERRED EMBODIMENT

Figures 1, 2:
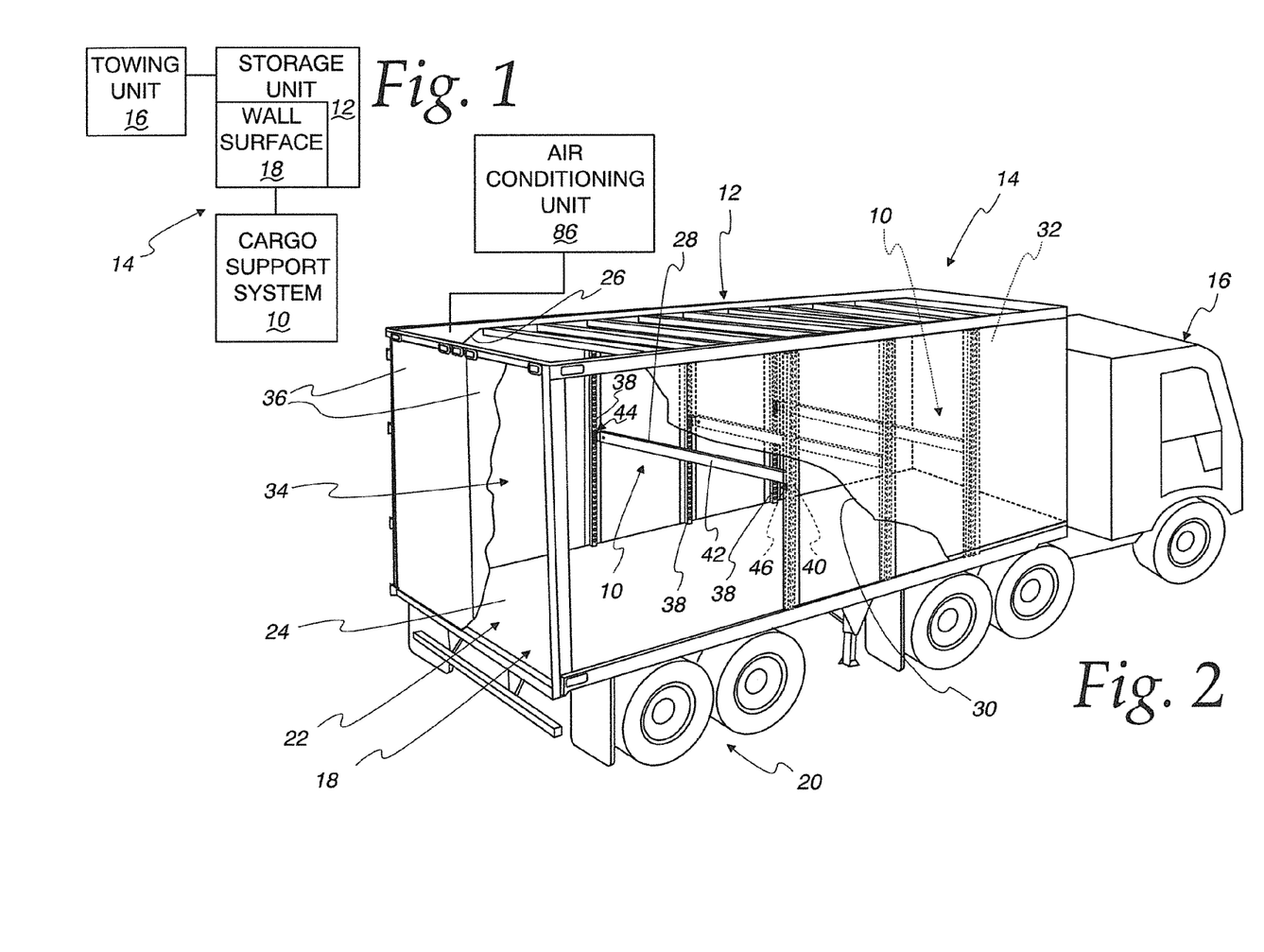
FIG. 1 is a schematic representation of the combination of an over-the-road vehicle with a storage unit and a cargo support system, according to the present invention.
FIG. 2 is a perspective view of one specific form of vehicle, in the form of a semi-trailer, with the cargo support system in a storage space defined by the trailer thereon.

As shown schematically in FIG. 1, the present invention is directed to the combination of a cargo support system 10 and a storage unit 12 that are part of an over-the-road vehicle at 14. The vehicle 14 includes a towing unit 16 that moves the storage unit 12. The storage unit 12 has an internal wall surface 18 bounding a storage space within which the cargo support system 10 is placed.

The generic showing of components in FIG. 1 is intended to encompass the basic components, as shown in exemplary forms herein, and variations thereof consistent with the inventive concepts herein.

As one example, the over-the-road vehicle 14 may be in the nature of a semi-trailer, as shown in FIGS. 2-6, with the towing unit 16 in the form of a tractor and the storage unit 12 in the form of a trailer that is connected to the tractor 16 through a conventional hitch arrangement.

The storage unit/trailer 12 is supported upon a wheeled carriage 20. A storage space at 22 is bounded by the internal wall surface 18. The wall surface 18 consists of a floor surface 24, a ceiling surface 26, first and second facing side wall surfaces 28, 30, and a front wall surface 32.

An access opening at 34 is selectively exposed and blocked by a pair of hinged doors 36.

Basic components of the cargo support system 10 are first and second vertically extending logistic tracks 38, 40, respectively operatively mounted to the side wall surfaces 28, 30, and a first elongate beam 42 with spaced ends 44, 46 attached respectively to the tracks 38, 40.

The beam 42 and tracks 38, 40 can be made with a conventional construction. The owner herein currently offers its Lift-A-Deck™ system, with a form thereof described in U.S. Pat. No. 6,074,143, entitled "Adjustable Decking System For Supporting Freight". The disclosure therein is incorporated herein by reference.

The structural details of the beam 42 and tracks 38, 40 are not critical to the present invention. It suffices to say that the tracks 38, 40 have vertically spaced slots 48, shown for the exemplary track 38, to releasably engage a connector 50 on the beam end 44. A user can place the connector 50 on the beam end 44 in the slot 48 at the desired vertical height. The same connection is present between the opposite beam end 46 and the track 40.

Any number of pairs of the tracks 38, 40 can be utilized at desired intervals along the fore-and-aft extent of the storage space 22.

Figure 3:
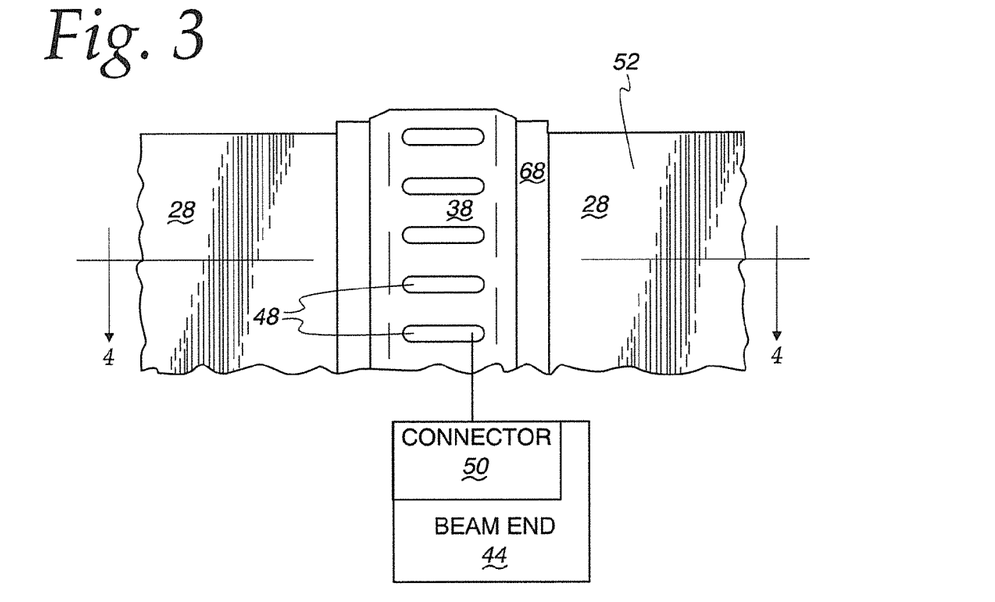
FIG. 3 is a partially schematic, enlarged, fragmentary, elevation view of a logistic track on the cargo support system mounted to a side wall surface bounding the storage space on the vehicle in FIG. 2 with a mounting plate between the track and side wall surface.
Figure 4:
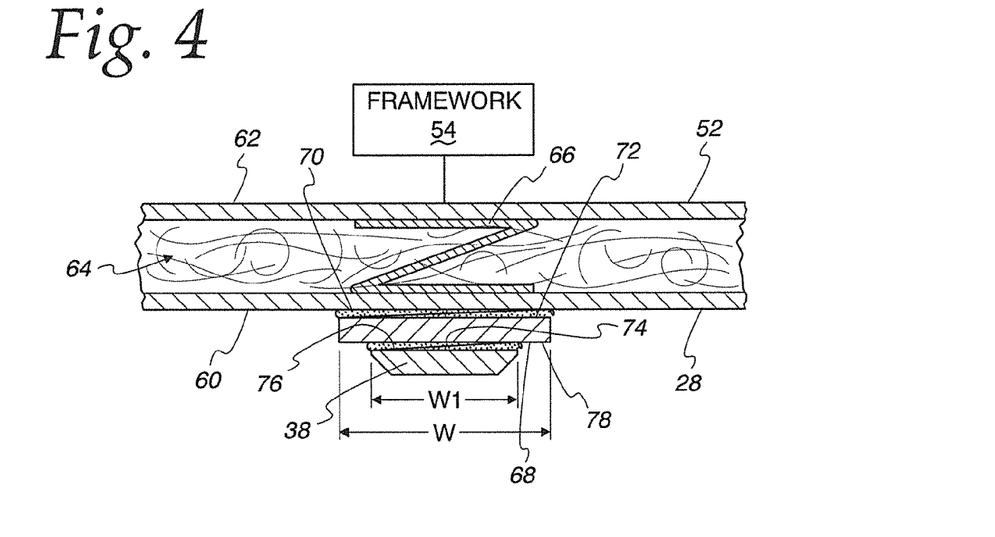
FIG. 4 is an enlarged, cross-sectional view of the components in FIG. 3 taken along line 4-4 therein.

The side wall surfaces 28, 30 are defined by panels 52 that are secured to suitable framework 54 that is conventional in nature. The framework 54 may include a top plate or rail 56 and a bottom rail 58 to which the panels 52 are connected to define the exemplary side wall surface 28. Conceivably a single panel 52 might be utilized.

Each of the panels 52 has an inner layer 60, defining the wall surface 28, and an outer layer 62. The space between the inner and outer layers 60, 62 is filled with insulation 64. The insulation 64 may be any conventional type of insulation material that is either preformed or formed in situ.

The panel 52 shown in FIG. 4 has a reinforcing component 66 with a generally Z-shaped cross-sectional configuration.

All of the tracks 38, 40 throughout the storage space 22 can be operatively mounted in the same fashion. Exemplary track 38 is maintained operatively mounted to the wall surface 28 through the use of an adhesive. While it is conceivable that the track 38 could be directly mounted to the wall surface 28 using adhesive, in a preferred form, a mounting plate 68 is utilized and interposed between the track 38 and wall surface 28. The mounting plate 68 has a width W that is greater than the width W1 for the track 38.

One preferred material for the mounting plate is a composite sold by Wabash National Corporation under the registered mark DuraPlate®. Other suitable materials could be readily selected by one skilled in the art, using commercially available products.

An adhesive layer 70 is interposed between a mounting surface 72 on the mounting plate 68 and the panel surface 28. The layer 70 preferably covers all or most of the areal extent of the mounting surface 72 on the mounting panel 68 that extends substantially fully between the ceiling surface 26 and floor surface 24.

Similarly, an adhesive layer 74 is used to bond a flat surface 76 on the track 38 to the mounting plate surface 78 that faces oppositely to the mounting plate surface 72. Preferably, the adhesive layer overlies all, or substantially all, of the area of the flat track surface 76 that abuts to the plate surface 78.

Typically, the planes of the surfaces 28, 72, 76, 78 are all parallel, though this is not a requirement.

Figure 5:
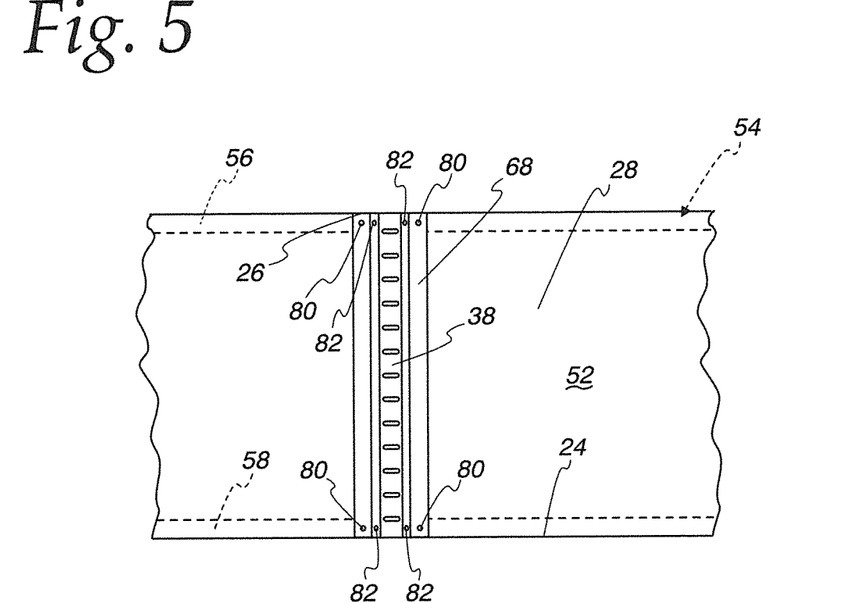
FIG. 5 is a fragmentary, side elevation view of part of the side wall, as shown in FIGS. 3 and 4, with the track and mounting plate operatively mounted thereto.

In a preferred form, the track 38 and mounting plate 68 are coextensive over the entire vertical extent of the surface 28 between the floor and ceiling surfaces 24, 26.

Adhesives with properties suitable to fixedly maintain the track 38 upon the mounting plate 68 and the mounting plate 68 in turn upon the surface 28 could be readily selected by one skilled in this art from any of a number of adhesives, well known and commercially available.

For further structural integrity, fasteners 80 extend into the mounting plate 68 and framework 54, and preferably the top and bottom rails 56, 58 thereon, to fixedly secure these components together. The fasteners 80 would typically be in the form of rivets.

Fasteners 82 optionally extend into the track 38 and the mounting plate 68, and potentially additionally into the framework 54. In the depicted embodiment, the fasteners 82 at the top of the track 38 extend into the top rail 56. At the bottom of the track 38, the fasteners 82 extend into the bottom rail 58. The fasteners 82 may likewise be in the form of rivets.

In FIG. 4, the track 38 is shown overlying the reinforcing component 66.

Figure 6:
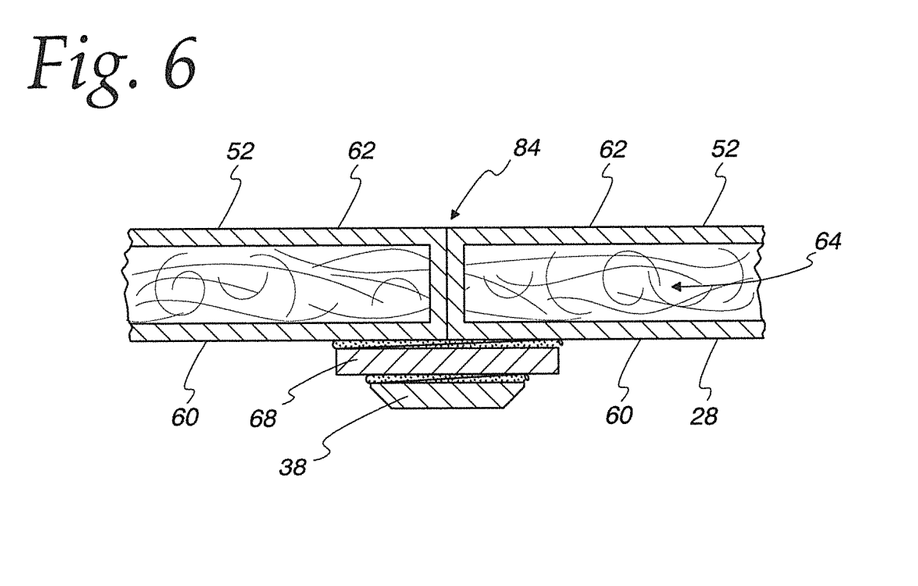
FIG. 6 is a view as in FIG. 4 wherein the mounting plate and track are mounted at a different location along the side wall.

In FIG. 6, a mounting location for the track 38 is at a juncture at 84 between adjacent panels 52, whereat the panels 52 become locally rigidified.

With the above-described arrangement, the track 38 can be operatively mounted potentially without the use of any fasteners extending through the panels 52. In a more preferred form, fasteners 80 are provided in at least the mounting plate 68 at the top and bottom thereof to engage the top and bottom rails 56, 58 respectively. The fasteners 80, 82 potentially take strain off of the adhesive that provides the primary securement for the track 38.

It is also conceivable that the adhesive would not be applied over the full vertical or horizontal extent of the surfaces 72, 76. It is preferred that at least a majority of the vertical extent of these surfaces be bonded with an adhesive. The nature of the adhesive and its properties may dictate required coverage area.

With the preferred construction shown in FIG. 5, more preferably with the fasteners 82 omitted, it is possible to operatively mount the track 38 without any fasteners between those fasteners 80 extending into the mounting plate 68 at the top and bottom thereof. The invention, however, does contemplate that one or more fasteners might be utilized between the depicted locations for the fasteners 80. However, it is preferred that the panels 52 not be penetrated by many, or more preferably any, fasteners over the vertical distance between the top and bottom rails 56, 58. By avoiding direction of fasteners into insulated panels, the structural integrity of the panels can be maintained. Further, by avoiding the formation of an opening in communication with any insulating material, exposure of the insulation material to environmental moisture can be avoided.

The insulated design is used to maintain a controlled environment within the storage space 22. A conventional air conditioning unit 86 may be employed for this purpose, either as a refrigeration source for cooling the storage space, or a heating source for raising the temperature of the storage space 22.

Figure 7:
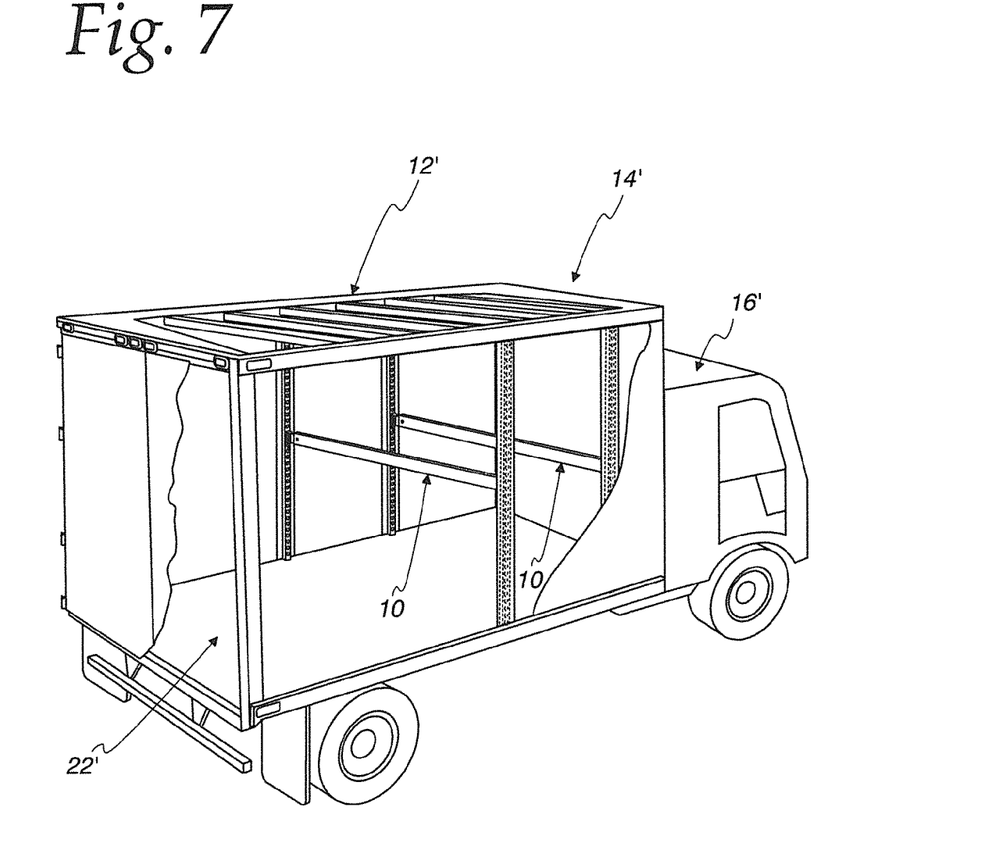
FIG. 7 is a view as in FIG. 2 of a modified form of over-the-road vehicle into which the inventive cargo support system is incorporated.

FIG. 7 depicts an alternative type of over-the-road vehicle 14' that is within the generic showing in FIG. 1. The vehicle 14' has a towing unit 16' with a storage unit 12' fixedly attached thereto. The cargo support system 10 within the cargo storage space 22', defined by the storage unit 12', is mounted operatively in the same fashion within the vehicle 14' as within the vehicle 14.

The cargo support system 10 can be incorporated as a new equipment OEM installation or as an after market up-fit or retrofit installation.

Figure 8:
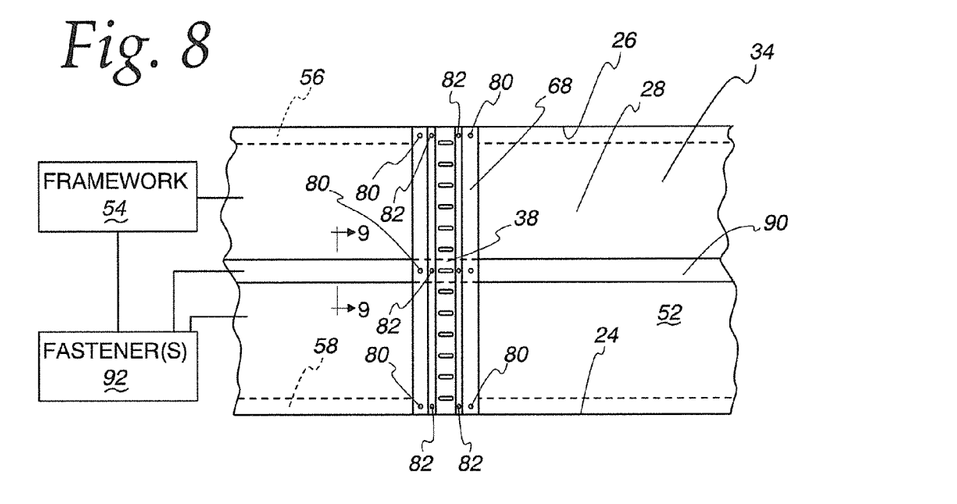
FIG. 8 is a view as in FIG. 5 and showing an optional reinforcing horizontal doubler component on the side wall to which the track and mounting plate are connected.
Figure 9:
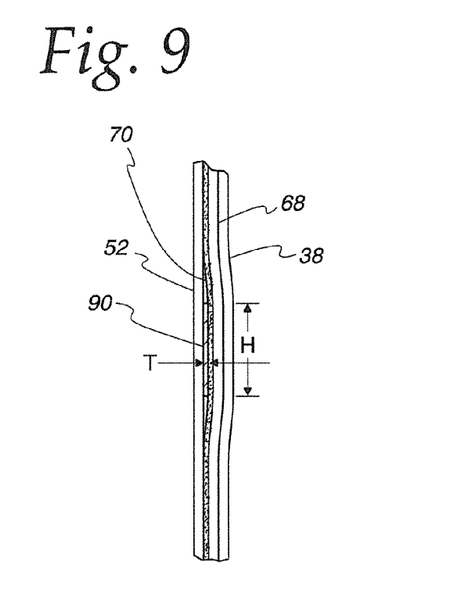
FIG. 9 is a cross-sectional view of the side wall taken along line 9-9 of FIG. 8 and showing a region of the mounting plate that overlies the horizontal doubler component.

In FIGS. 8 and 9, modification is shown to the side wall that defines the surface 28, as seen in FIG. 5. The mounting plate 68 is attached to the panel surface 28 in the same manner as previously described. The only significant modification with the structure in FIG. 8 is that a reinforcing, horizontal doubler component 90 is incorporated. The component 90 is located generally at the mid-height region between the floor surface 24 and the ceiling surface 26. The component 90 may extend continuously over the full fore-and-aft extent of the side wall or alternatively over a lesser extent so long as the component 90 can be securely held to provide a solid reinforcement for the mounting plate 68 and adhesively connected track 38. Fasteners 80, 82 can be used to extend into the mounting plate 68 alone and/or the overlapped portions of the track 38 and mounting plate 68, so as to additionally extend into the top plate/rail 56 and bottom rail 58. The fasteners 80, 82 may extend into the component 90.

The component 90 is fixedly secured to the wall surface 28 through suitable means. In one exemplary form, fasteners 92, which may be rivets or the like, are utilized to secure the component 90 to the panel 52 and/or the associated framework 54.

The component 90 rigidifies the panels 52 and provides a rigid support location for the mounting plate 68 and track 38 at a mid-height location. In one form, the component 90 has a height H on the order of six inches and a thickness T on the order of one-quarter inch. The component may be made from aluminum or other suitable material with good strength characteristics. Aluminum is selected because of its relatively light weight.

As seen in FIG. 9, the track 38 and mounting plate 68, that are adhered to each other, will bend slightly to accommodate the component thickness T.

Fasteners 80, as previously described, can be used to connect the mounting plate 68 to the component 90 and one or both of the panel 52 and framework 54. Fasteners 82 can be used in like fashion to extend additionally through the track 38.

The mounting plate 68 is connected to the side wall as previously discussed, utilizing adhesive and fasteners 80, 82, with the track 38 secured to the panel 68 utilizing adhesive and optionally fasteners 82.

The use of the component 90 is desirable from the standpoint that it reinforces the panels 52, the track 38, and the connection therebetween. The component 90 is also desirable, particularly with a retrofitting operation, wherein the track 38 is connected to side walls that are not reasonably flat over the footprint of the mounting plate 68 thereon.

While the adhesive layer 70 is shown between the mounting plate 68 and surface 28 of the panel 52, if the component 90 is utilized, the adhesive layer 70 can be eliminated. It is still preferred that the track 38 be adhesively bonded to the mounting plate 68.

To avoid any compromising of the insulating characteristics of the side walls, the fasteners 80, 82 that extend into the component 90 may be sized and configured so as not to fully penetrate the panels 52. However, this is not required.

Figure 10:
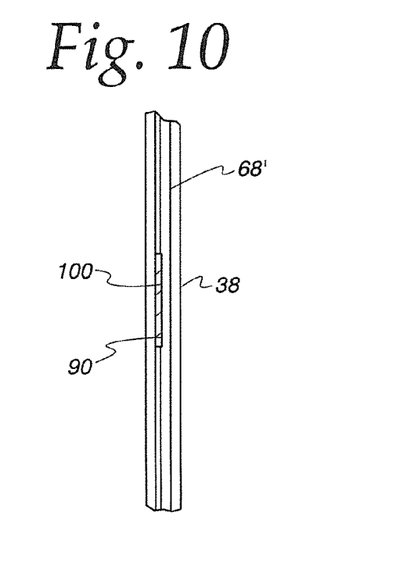
FIG. 10 is a view as in FIG. 9 and showing a modified form of mounting plate that is formed to define a receptacle for the horizontal doubler component.

In FIG. 10 a modified form of mounting plate is shown at 68'. The mounting plate 68' differs from the mounting plate 68 by reason of defining a receptacle 100 to receive the component 90, thereby obviating the need to bend the mounting plate 68 and track 38 where they overlie the component 90.

Figure 11:
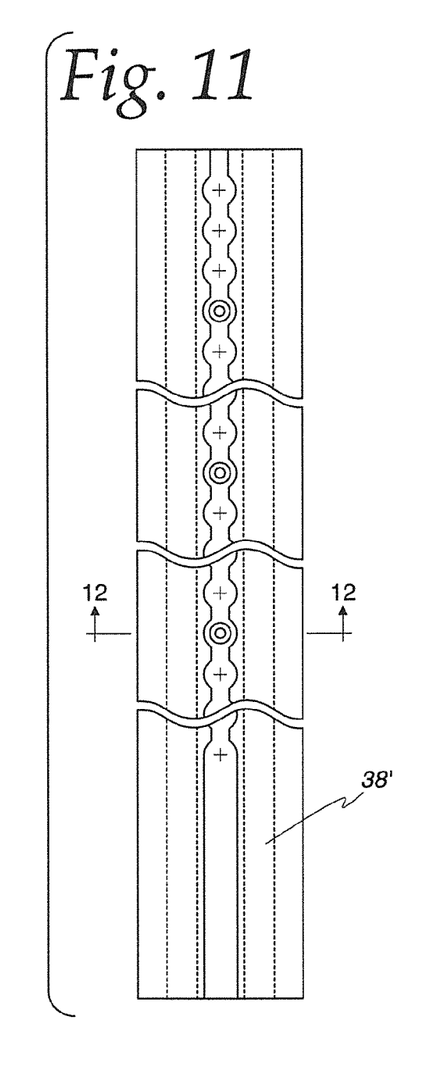
FIG. 11 is an elevation view of a modified form of track usable according to the invention.
Figure 12:
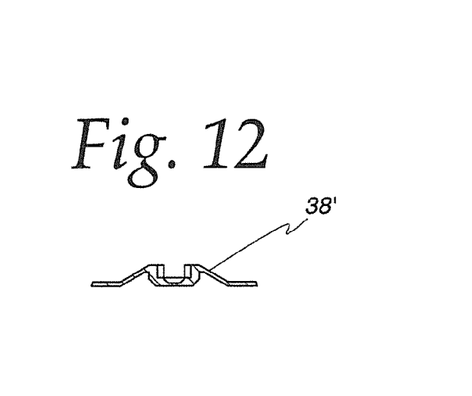
FIG. 12 is a cross-sectional view of the track taken along line 12-12 of FIG. 11.

The precise configuration of the tracks 38, 40 and the structure through which they cooperate with the beams 42 to support the beams 42 at selected different heights are not critical to the present invention. The track construction utilized by the owner herein in its Lift-A-Deck™ system is shown at 38' in FIGS. 11 and 12. The invention contemplates the use of any structure cooperating between tracks and beams that stably supports the beams.

Figure 13:
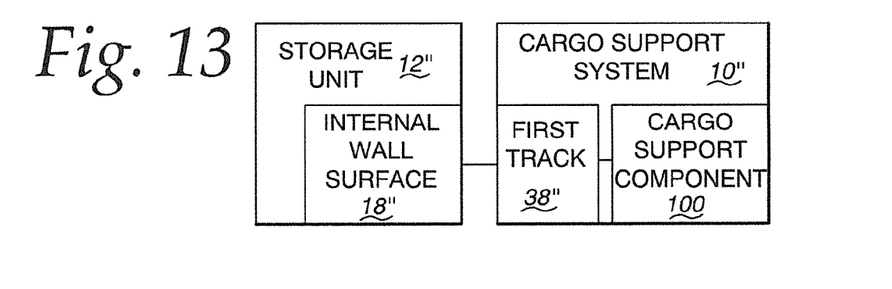
FIG. 13 is a schematic representation of the combination of a storage unit with another form of cargo support system, according to the invention.

In FIG. 13, another combination, according to the invention, is schematically depicted. The combination includes a storage unit 12", with an internal wall surface 18" bounding a storage space.

An associated cargo support system 10" has a first track 38" operatively mounted to the internal wall surface 18" at a first location, the track 38" is configured to connect to a part of a cargo support component 100 to operatively support the cargo support component 100.

The schematic representation is intended to encompass a range of track configurations and cargo support component configurations to include virtually any configuration of component that is required to be fixed to the wall surface 18" and support the weight of the part of the component 100, and any additional weight from supported cargo, whether it fully spans between spaced surfaces or is cantilever mounted.

The remaining components described in the embodiments in FIGS. 1-12 can be incorporated similarly into the combination of FIG. 13, to include plates, panels with inner and outer layers, insulation, adhesive, fasteners, etc.

The foregoing disclosure of specific embodiments is intended to be illustrative of the broad concepts comprehended by the invention.

The invention claimed is:

1. In combination:
a) a storage unit associated with an over-the-road vehicle, the storage unit having an internal wall surface bounding a storage space and including spaced and facing first and second wall surfaces and a floor surface; and
b) a cargo support system comprising:
first and second vertically extending tracks operatively and respectively mounted one each to the first and second wall surfaces; and
at least a first elongate beam having spaced first and second ends attached respectively to the first and second tracks in an operative position spaced above the floor surface,
wherein at least one of the first or second tracks is maintained operatively mounted to the first wall surface through the use of an adhesive,
wherein the storage unit comprises a framework and a plurality of panels on the framework defining the internal wall surface, and at least one for the first or second tracks is secured by at least one fastener extending into the framework at at least one of a top and bottom location on the at least one track,
wherein the framework comprises top and bottom rails and at least a respective one of the fasteners extends into one of the top and bottom rails and the at least one of the first or second tracks, and another of the respective one of the fasteners extends into the other of the top and bottom rails and at least one of the first or second tracks,
wherein the storage unit comprises a first plate that resides between the first wall surface and the at least one of the first or second tracks over substantially a full vertical extent of the at least one of the first or second tracks and there are no fasteners extending into the first plate and first wall surface over a majority of a distance between the top and bottom plates.

2. The combination according to claim 1 wherein the at least one of the first or second tracks has a vertical extent and is adhesively bonded to the first wall surface over the majority of the vertical extent of the at least one of the first or second tracks.

3. The combination according to claim 2 wherein the at least one of the first or second tracks is adhesively bonded over substantially the entire vertical extent of the at least one of the first or second tracks.

4. The combination according to claim 2 wherein the first wall surface is defined by a first panel comprising an inner and an outer layer with insulation therebetween.

5. The combination according to claim 4 wherein the first panel comprises a vertically extending reinforcing component and the first track is operatively mounted in overlying relationship with the reinforcing component.

6. The combination according to claim 1 wherein the at least one fastener comprises a rivet.

7. In combination:
a) a storage unit associated with an over-the-road vehicle, the storage unit having an internal wall surface bounding a storage space and including spaced and facing first and second wall surfaces and a floor surface; and
b) a cargo support system comprising:
first and second vertically extending tracks respectively operatively mounted one each to the first and second wall surfaces; and
at least a first elongate beam having spaced first and second ends attached respectively to the first and second tracks in an operative position spaced above the floor surface, wherein at least one of the first or second tracks is maintained operatively mounted to the first wall surface through the use of an adhesive, wherein the cargo support system unit comprises a first plate that resides between the first wall and the at least one of the first or second tracks wherein the first plate is adhesively bonded to the first wall surface and the at least one of the first or second tracks is adhesively bonded to the first plate, wherein the internal wall surface further comprises a ceiling surface and the at least one of the first or second tracks and first plate are coextensive over substantially an entire distance between the floor and ceiling surfaces, wherein the first plate is adhesively bonded to the first wall surface and the at least one of the first or second tracks is adhesively bonded to the first plate over substantially the entire distance between the floor and ceiling surfaces, and wherein the framework comprises top and bottom rails and fasteners extend into the first plate, first wall surface and framework at each of the top and bottom rails.

8. The combination according to claim 1 wherein the storage unit comprises a refrigeration source for cooling the storage space.

9. The combination according to claim 1 wherein the storage unit is a trailer on a semi-trailer unit.

10. The combination according to claim 1 wherein the storage unit is fixedly attached to a towing unit.

11. The combination according to claim 7 wherein the fasteners comprise rivets extending through the at least one of the first or second tracks and first plate and into each of the top and bottom rails.

12. A cargo support system for use within a storage unit associated with an over-the-road vehicle, comprising:

first and second vertically extending tracks configured to be operatively mounted one each to respective opposite first and second wall surfaces of a storage unit;

at least a first elongate beam having spaced first and second ends attached respectively to the first and second tracks in an operative position spaced above a floor surface of the storage unit, wherein at least one of the first or second tracks is maintained respectively operatively mounted to the first wall surface through the use of an adhesive, wherein the at least one track is configured to be secured by a fastener to at least one of a top or a bottom location of a framework portion of the storage unit, wherein the framework comprises top and bottom rails and at least a respective one of the fasteners is configured to extend into one of the top and bottom rails and the at least one of the first or second tracks, and another of the respective one of the fasteners is configured to extend into the other of the top and bottom rails and the at least one of the first or second tracks, further comprising a first plate that resides between the first wall surface and the at the least at least one of the first or second tracks over substantially a full vertical extent of the at least one of the first or second tracks and there are no fasteners extending into the first plate and first wall surface over a majority of a distance between the top and bottom plates.

13. The cargo support system of claim 12, wherein the at least one of the first or second tracks has a vertical extent and is adhesively bonded to the first wall surface over the majority of the vertical extent of the at least one of the first or second tracks.

14. The cargo support system of claim 13, wherein the at least one of the first or second tracks is adhesively bonded over substantially the entire vertical extent of the at least one of the first or second tracks.

15. The cargo support system of claim 12, wherein the system is configured to be used in conjunction with a refrigeration source for cooling the storage space.

16. A cargo support system for use within a storage unit associated with an over-the-road vehicle, comprising:

first and second vertically extending tracks configured to be respectively operatively mounted one each to opposite first and second wall surfaces of a storage unit;

at least a first elongate beam having spaced first and second ends attached respectively to the first and second tracks in an operative position spaced above a floor surface of the storage unit, wherein at least one of the first or second tracks is maintained operatively mounted to the first wall surface through the use of an adhesive, further comprising a first plate configured to be disposed between the first wall and the at least one of the first or second tracks wherein the first plate is adhesively bonded to the first wall surface and the at least one of the first or second tracks is adhesively bonded to the first plate, wherein the wall surface further comprises a ceiling and the at least one of the first or second tracks and first plate are coextensive over substantially an entire distance between the floor and ceiling, wherein the first plate is adhesively bonded to the first wall surface and the at least one of the first or second tracks is adhesively bonded to the first plate over substantially the entire distance between the floor and ceiling, and wherein the framework comprises top and bottom rails and fasteners extend into the first plate, first wall surface and framework at each of the top and bottom rails.

17. The cargo support system of claim 16, wherein the fasteners comprise rivets extending through the at least one of the first or second tracks and first plate and into each of the top and bottom rails.

* * * * *